United States Patent [19]

Smith et al.

[11] Patent Number: 4,959,772
[45] Date of Patent: Sep. 25, 1990

[54] SYSTEM FOR MONITORING AND CAPTURING BUS DATA IN A COMPUTER

[75] Inventors: Royston L. Smith, Plantation; Maria V. Rabaza, Miami Lakes, both of Fla.

[73] Assignee: Gould Inc., Rolling Meadows, Ill.

[21] Appl. No.: 173,222

[22] Filed: Mar. 24, 1988

[51] Int. Cl.⁵ .............................................. G06F 13/00
[52] U.S. Cl. .................................. 364/200; 364/267;
364/267.91; 364/232.7; 364/240; 364/240.1;
364/238; 364/243; 364/252
[58] Field of Search ... 364/200 MS File, 900 MS File;
371/16, 18, 20, 22

[56] References Cited

U.S. PATENT DOCUMENTS

| | | | |
|---|---|---|---|
| 3,999,053 | 12/1976 | Dalmasso | 371/18 |
| 4,166,290 | 8/1979 | Furtman et al. | 364/200 |
| 4,308,615 | 12/1981 | Koegel et al. | 371/20 |
| 4,392,208 | 7/1983 | Burrows et al. | 364/900 |
| 4,459,656 | 7/1984 | Wilder, Jr. | 364/200 |
| 4,636,941 | 1/1987 | Suko | 364/200 |
| 4,639,917 | 1/1987 | Furuta | 371/16 |

Primary Examiner—Raulfe B. Zache

Attorney, Agent, or Firm—Fleit, Jacobson, Cohn, Price, Holman & Stern

[57] ABSTRACT

A system for troubleshooting or debugging the various modules of a digital computer which are connected to the ports of a common system bus. A control unit transmits serial function and data codes to a serial bus link gate array whose parallel outputs are further processed to generate steering and clock commands. A first set of bus interface multiplexers are connected to each of the lines of the address, data and control fields of the system bus. A second set of multiplexers cause information represented by digital signals on selected ones of the lines in selected ones of the fields to be stored in a plurality of RAMs in response to the steering commands. A trigger logic is provided for selectively starting and stopping different clock signals in response to the clock commands. Information can be stored in the RAMs continuously until the RAMs are full, until a specified smaller amount of information has been stored in the RAMs, or until a specified event occurs, in response to predetermined ones of the function and data codes. The control unit can retrieve and organize the information captured in the RAMs for display to enable a system operator in locating faults in the computer.

24 Claims, 11 Drawing Sheets

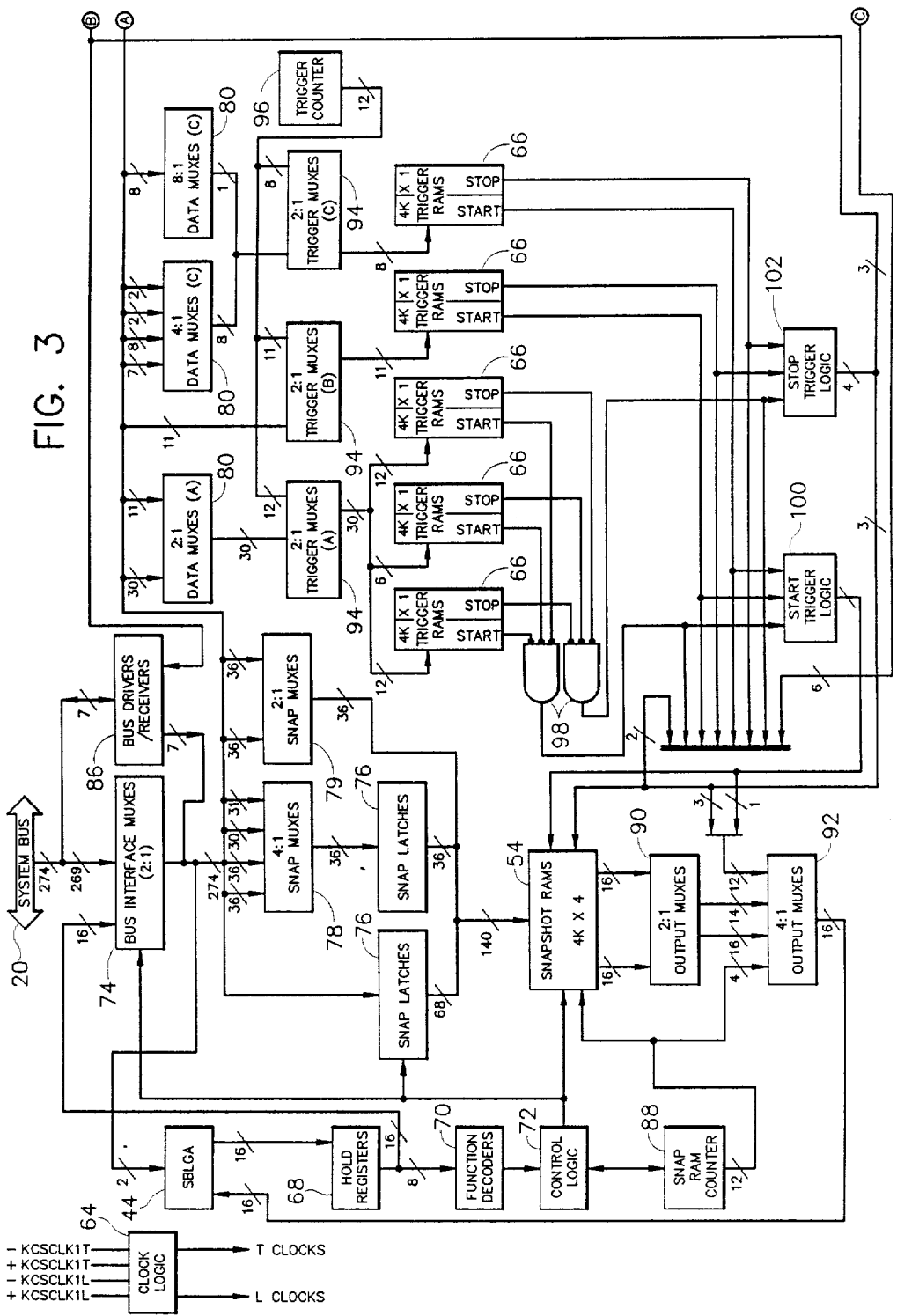

FIG. 4

| FUNCTION NAME | FUNCTION CODES BIT # 0 1 2 3 4 5 6 7 | DATA CODES 0 1 2 3 4 5 6 7 8 9 10 11 12 13 14 15 |
|---|---|---|
| 0. NOP | 0 0 0 0 0 0 0 0 | |
| 1. DIAG HOLD AND READ SNAP RAM | 0 0 0 0 0 0 0 1 | |
| 2. DIAG INC AND READ SNAP RAM | 0 0 0 0 0 0 1 0 | |
| 3. DIAG DEC AND READ SNAP RAM | 0 0 0 0 0 0 1 1 | ←— 16 BITS OF DATA —→ |
| 4. DIAG HOLD AND WRITE SNAP RAM | 0 0 0 0 0 1 0 0 | ←— 16 BITS OF DATA —→ |
| 5. DIAG INC AND WRITE SNAP RAM | 0 0 0 0 0 1 0 1 | ←— 16 BITS OF DATA —→ |
| 6. DIAG DEC AND WRITE SNAP RAM | 0 0 0 0 0 1 1 0 | |
| 7. PRESET SNAP RAM COUNTER | 0 0 0 0 0 1 1 1 | 0 0 0 ←— PRESET ADDRESS —→ |
| 8. PRESET TRIGGER RAM COUNTER | 0 0 0 0 1 0 0 0 | 0 0 0 ←— PRESET ADDRESS —→ |
| 9. START DATA ACQ ENABLES | 0 0 0 1 0 0 0 0 | |
| 10. STOP DATA ACQ ENABLES | 0 0 0 1 0 0 0 1 | |
| 11. MUX STEERING REGISTER | 0 0 0 1 0 0 1 0 | |
| 12. LOAD SNAP RAM CS REG | 0 0 0 1 0 0 1 1 | |
| 13. UNCOND. STOP DATA ACQ | 0 0 0 1 0 1 0 0 | |
| 14. SINGLE STEP STOP CLK | 0 0 0 1 0 1 0 1 | |
| 15. SINGLE STEP GSTPRQ | 0 0 0 1 0 1 1 0 | |
| 16. SPARE | 0 0 0 1 0 1 1 1 | |

FIG. 5

| FUNCTION NAME | FUNCTION CODES | | | | | | | | DATA CODES | | | | | | | | | | | | | | | |
|---|---|---|---|---|---|---|---|---|---|---|---|---|---|---|---|---|---|---|---|---|---|---|---|---|
| BIT # | 0 | 1 | 2 | 3 | 4 | 5 | 6 | 7 | 0 | 1 | 2 | 3 | 4 | 5 | 6 | 7 | 8 | 9 | 10 | 11 | 12 | 13 | 14 | 15 |
| 17. SPARE | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 |
| 18. SPARE | 0 | 0 | 0 | 1 | 1 | 0 | 0 | 1 | 0 | 0 | 0 | 0 | 0 | 0 | 0 | 0 | 0 | 0 | 0 | 0 | 0 | 0 | 0 | 0 |
| 19. CLEAR/SET START/STOP BREAKPTS | 0 | 0 | 0 | 1 | 1 | 0 | 1 | 0 | START RAM CS | STOP RAM CS | START BIT | STOP BIT | 0 | 0 | 0 | 0 | 0 | 0 | 0 | B11 | B12 | B13 | B14 | B15 |
| 20. CLEAR/SET TRIGGER ALL RAMs | 0 | 0 | 0 | 1 | 1 | 0 | 1 | 1 | START RAM CS | STOP RAM CS | START BIT | STOP BIT | 0 | 0 | 0 | 0 | 0 | 0 | 0 | B11 | B12 | B13 | B14 | B15 |
| 21. SNAP OFF/SETUP MODE | 0 | 0 | 0 | 1 | 1 | 1 | 0 | 0 | | | | | | | | | | | | | | | | |
| 22. SNAP OFF/RUN MODE | 0 | 0 | 0 | 1 | 1 | 1 | 0 | 1 | | | | | | | | | | | | | | | | |
| 23. SNAP ON/SETUP MODE | 0 | 0 | 0 | 1 | 1 | 1 | 1 | 0 | | | | | | | | | | | | | | | | |
| 24. SNAP ON/RUN MODE | 0 | 0 | 0 | 1 | 1 | 1 | 1 | 1 | | | | | | | | | | | | | | | | |
| 25. SPARE | 0 | 0 | 1 | 0 | 0 | 0 | 0 | 0 | | | | | | | | | | | | | | | | |
| 26. LOAD SNAP ADDR. CNTR | 0 | 0 | 1 | 0 | 0 | 0 | 0 | 1 | | | | | | | | | | | | | | | | |
| 27. LOAD 16 SELF TEST LINES | 0 | 0 | 1 | 0 | 0 | 0 | 1 | 0 | | | | | | | | | | | | | | | | |
| 28. RESET ALL STPCLKS | 0 | 0 | 1 | 0 | 0 | 0 | 1 | 1 | | | | | | | | | | | | | | | | |
| 29. SPARE | 0 | 0 | 1 | 0 | 0 | 1 | 0 | 0 | | | | | | | | | | | | | | | | |
| 30. SET GSTPRQ | 0 | 0 | 1 | 0 | 0 | 1 | 0 | 1 | | | | | | | | | | | | | | | | |
| 31. SET STPCLK | 0 | 0 | 1 | 0 | 0 | 1 | 1 | 0 | | | | | | | | | | | | | | | | |
| 32. SPARE | 0 | 0 | 1 | 0 | 0 | 1 | 1 | 1 | | | | | | | | | | | | | | | | |

| F/D CODE | |
|---|---|
| 21 | SNAP OFF/SETUP |
| 22 | SNAP OFF/RUN |
| 23 | SNAP ON/SETUP |
| 24 | SNAP ON/RUN |

OPCODE FIELD         (7 BITS)

BITS 03-06    USED AS UNCORRECTED WORD FLAGS ON MEMORY DATA RETURNS
BITS 00-02    SPECIFY THE MAJOR TRANSACTION AS FOLLOWS

| BITS | | | | |
|---|---|---|---|---|
| 0 | 1 | 2 | | |
| 0 | 0 | 0 | NOP | |
| 0 | 0 | 1 | INTERRUPT REQUEST | (NO PARITY ASSOCIATED) |
| 0 | 1 | 0 | LATE STATUS TRANSFER | (NO PARITY ASSOCIATED) |
| 0 | 1 | 1 | NOT USED | |
| 1 | 0 | 0 | DIAGNOSTIC MEMORY DATA RETURN | (64 BITS ON DATA BUS) |
| 1 | 0 | 1 | SEMAPHORE MEMORY DATA RETURN | (64 BITS ON DATA BUS) |
| 1 | 1 | 0 | 64 BIT MEMORY DATA RETURN | (64 BITS ON DATA BUS) |
| 1 | 1 | 1 | 128 BIT MEMORY DATA RETURN | (EVEN DOUBLEWORD IS ON EXPANDED BUS ODD DOUBLEWORD IS ON DATA BUS) |

| Bits 0 | 1 | 2 | 3 | 4 | 5 | 6 | 7 | Operation | Notes |
|---|---|---|---|---|---|---|---|---|---|
| 0 | 0 | 0 | 0 | X | X | X | X | NOP | |
| 0 | 0 | 1 | 0 | 1 | 0 | 0 | 1 | READ 64 | (ADDR BUS) |
| 0 | 0 | 1 | 1 | 1 | 0 | 0 | 1 | READ 128 | (ADDR BUS) |
| 0 | 0 | 1 | 0 | 1 | 1 | 0 | 1 | READ 64 UNC | (ADDR BUS) |
| 0 | 0 | 0 | 0 | 1 | 1 | 1 | 1 | READ ECC AND CLR LOG | (ADDR BUS) |
| 1 | 1 | 0 | 0 | 0 | 0 | 0 | 0 | WRITE 32 | (ADDR AND DATA BUS AND ADDR BIT 29) |
| 1 | 1 | 0 | 0 | 1 | 0 | 0 | 0 | WRITE 64 | (ADDR AND DATA BUS) |
| 1 | 1 | 1 | 0 | 1 | 0 | 0 | 0 | WRITE 128 | (ADDR AND DATA BUS) |
| 1 | 1 | 0 | 0 | 1 | 1 | 1 | 0 | WRITE ECC 64 | (ADDR AND DATA BUS) |
| 1 | 1 | 0 | 0 | 0 | 1 | 1 | 1 | WRITE ECC 64 W/DRT | (ADDR AND DATA BUS) |
| 1 | 1 | 0 | 0 | 0 | 0 | 1 | 0 | SET BIT | (ADDR AND DATA BUS AND ADDR BIT 29) |
| 1 | 1 | 0 | 0 | 0 | 1 | 1 | 1 | SET SEMAPHORE | (ADDR AND DATA BUS AND ADDR BIT 29) |
| 1 | 1 | 0 | 0 | 0 | 1 | 1 | 0 | ZERO BIT | (ADDR AND DATA BUS AND ADDR BIT 29) |
| 1 | 1 | 0 | 0 | 0 | 1 | 1 | 1 | ZERO SEMAPHORE | (ADDR AND DATA BUS AND ADDR BIT 29) |
| 1 | 1 | 1 | 1 | B0 | B1 | B2 | B3 | WRITE BYTE(S) | (ADDR AND DATA BUS AND ADDR BIT 29) |
| 0 | 0 | 1 | X | 0 | 0 | 0 | 0 | SCRUB (INTERNAL) | (ADDR AND DATA BUS AND ADDR BIT 29) |

NOTES

1. IF ADDR BIT 29=0  CHECK EVEN DATA WORD
2. IF ADDR BIT 29=1  CHECK ODD DATA WORD

SYSTEM FOR MONITORING AND CAPTURING BUS DATA IN A COMPUTER

CROSS-REFERENCE TO RELATED APPLICATION

This application is related to an application for "Bus Structure for Overlapped Data Transfer" to Thomas filed on the same day as this application, copending as Ser. No. 07/173,212, and assigned to the assignee of this application.

BACKGROUND OF THE INVENTION

The present invention relates to high performance general purpose digital computer systems, and more particularly, to a system that permits detailed trouble shooting of such a general purpose computer system without impeding the performance thereof.

The three main units of a basic general purpose digital computer system are the central processing unit (CPU), the memory, and the input-output (I/O) units. In order to achieve high performance parallel computational power, super computers and mini-supercomputers utilize multiple interactive CPUs, pipeline architectures and array processors.

Digital codes carrying information inside a general purpose computer system must be communicated between the various units. The multiple wires that form the physical conduits for these digital codes are referred to as buses. Each of the I/O units of a computer system is given an address and each information location in the memory is given an address. To locate specific information in the memory, a digital code, namely the address of the information, is sent on an address bus to the memory by the CPU. At the same time other digital codes representing control signals are sent on a control bus to tell the memory either to read or to write the information from the memory location designated by the address on the address bus. The actual information coming to the CPU from the memory when the memory is read, or going to the memory from the CPU when the information is to be written, is also in the form of digital codes traveling along a data bus. Collectively these address, control and data buses may be referred to as a system bus.

In communicating information along the buses, it is conventional to employ a parity bit in the digital codes as a way of helping to detect single bit errors that may occur during transmission. The parity is determined by counting the number of ones in the byte or character code. If the number of ones is an odd number, and even parity is desired, then the parity bit is set to one so that there is an even total number of ones. If, on the other hand, odd parity is desired, and the word is the same as in the previous example, then a zero is selected for the parity bit so that there is an odd total number of ones. The parity generating circuit in the transmitting unit counts the number of ones in the code to be sent and sets the parity bit as required. The receiving unit also counts the number of ones and determines what the parity bit should be. Then it compares the received parity bit to the determined parity bit. If the parity bits match, then it is assumed that no error has occurred in the data transmission. On the other hand, if the parity bits do not match, then it is assumed that an error has occurred in the data transmission and appropriate action is taken. It will be understood that parity does not ensure that all errors in data transmission will be detected. For example, if an even number of ones were lost in the transmission, then the number of ones would still be odd or even, as it was before the transmission. However, the use of a parity bit provides a simple and convenient way of testing for errors that may occur in the course of data transmission inside the computer.

In conventional general purpose digital computer systems each module that sends data generates the parity bit and each module that receives data checks the parity. Thus each module has to have both parity generating and parity checking capabilities, which results in an unnecessary duplication of hardware within the computer.

Larger general purpose computer systems, e.g. mini, main frame, mini super and super computers, typically have some diagnostic or troubleshooting capabilities. In some instances, it is desirable to perform detailed troubleshooting by examining the actual bits and bytes of information communicated along the busses. Preferably such troubleshooting should not prevent or otherwise impede the normal operation of the computer so that users can continue using the system. It would be desirable to provide a system that could perform these diagnostic and parity checking functions with improved flexibility in regard to examining the digital signals transmitted along the system bus of a high performance digital computer.

SUMMARY OF THE INVENTION

It is therefore the primary object of the present invention to provide a system useful in trouble shooting or debugging the various modules of a digital computer which are connected to the ports of a common system bus.

According to the illustrated embodiment of the present invention, a control unit transmits serial function and data codes to a serial bus link gate array whose parallel outputs are further processed to generate steering and clock commands. A first set of bus interface multiplexers are connected to each of the lines of the address, data and control fields of the system bus. A second set of multiplexers cause information represented by digital signals on selected ones of the lines in selected ones in the fields to be stored in a plurality of RAMs in response to the steering commands. A trigger logic is provided for selectively starting and stopping different clock signals in response to the clock commands. Information can be stored in the RAMs continuously until the RAMs are full, until a specified smaller amount of information has been stored in the RAMs, or until a specified event occurs, in response to predetermined ones of the function and data codes. The control unit can retrieve and organize the information captured in the RAMs for display to enable a system operator in locating faults in the computer. The system also includes circuitry for continuously checking system bus parity and for transmitting a parity error signal on the clock cycle immediately following the detection of an actual parity error.

BRIEF DESCRIPTION OF THE DRAWINGS

FIG. 3 is a detailed block diagram of a preferred embodiment of the bus data monitoring and capturing system of the present invention, except for the parity checkers and parity control logic. The leads marked A, B and C connect to the correspondingly labeled leads of FIG. 6.

FIGS. 4 and 5 set forth a representative sequence of function and data codes that may be utilized in the preferred embodiment of the bus data monitoring and capturing system of the present invention.

FIGS. 13 and 14 list the signals which are decoded in the parity control logic of the preferred embodiment, and the bus associated with each signal.

DESCRIPTION OF THE PREFERRED EMBODIMENT

It will be understood by those skilled in the art that our invention is useful with a wide variety of general purpose digital computer architectures. However, for ease of understanding, a preferred embodiment of our bus data monitoring and capturing system will be described in conjunction with a particular mini-supercomputer architecture illustrated in FIG. 1 in very general terms.

A. An Exemplary Mini-Supercomputer Architecture That can Utilize the Bus Data Capturing and Monitoring System Referring to FIG. 1, the illustrated mini-supercomputer architecture is based upon tightly coupling dual processors, namely, a CPU 0 and a CPU 1, via a system bus 20. The architecture could be expanded to include more CPUs, e.g. a total of eight, over multiple system buses, e.g. a total of four, interconnected by high-speed intersystem bus links. The system bus 20 is organized to support parallel message (memory read/write and system control) transfers at a very high continuous rate, e.g. 19.25 M 64-bit (154 MBytes) transfers per second. The system bus 20 provides ports for connection to a plurality of asynchronous system units or modules such as CPU 0 and CPU 1, a main memory 22, a combined bus controller and system control unit (BC/CU) 24, a bus data monitoring and capturing system or "bus snapshot" unit (BSS) 26 in accordance with the present invention, an intersystem bus link (ISBL) 28, and a universal input/output microengine (UIOM) 30.

Figure 1:
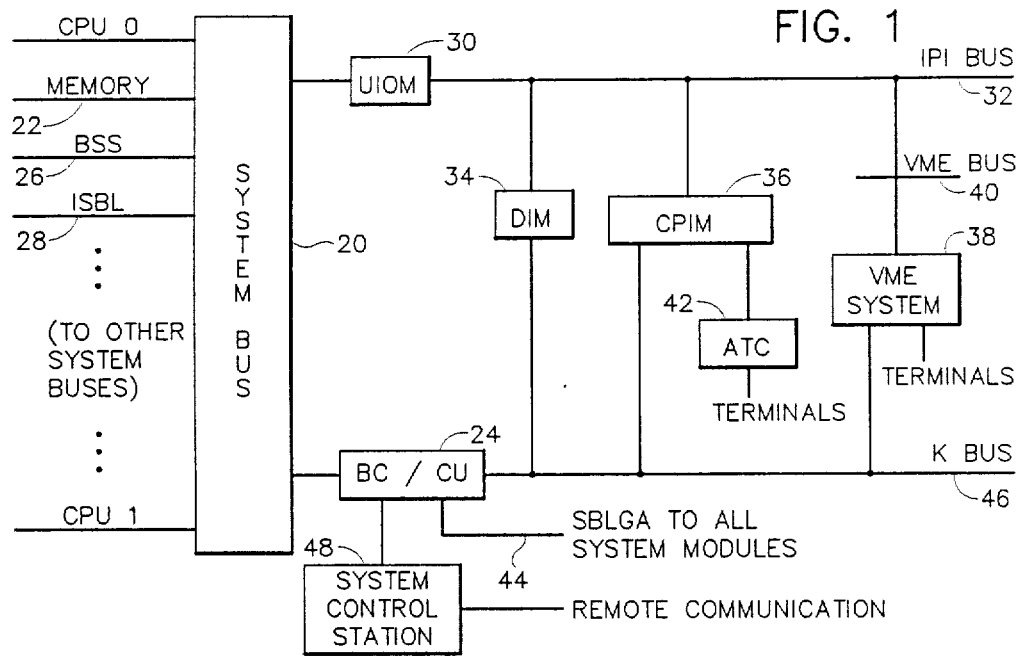
FIG. 1 is a simplified block diagram of an exemplary architecture of a mini-supercomputer utilizing the bus data monitoring and capturing system of the present invention.

A plurality of I/O modules are connected to an industry standard Intelligent Peripheral Interface (IPI) bus 32 as may best be seen in FIG. 1, off the UIOM 30. These I/O modules can include a disk intelligent module (DIM) 34, a communication processor intelligent module (CPIM) 36 and a virtual memory module 38 which in turn supports a VME bus 40. The VME bus is itself a complete microprocessor system with tape, terminal cluster and communications subsystems such as printers, tapes, ETHERNET (trademark) networks, etc. The DIM 34 is capable of supporting a plurality of high speed disk drives. The CPIM 36 has a plurality of communications ports that can be configured independently to support a host of communications protocols including bit synchronous, byte synchronous, IBM bi-sync, and asynchronous. Clusters of "dumb" and "smart" terminals may be connected to either the CPIM 36 or the VME bus 40. Connection of terminals to the CPIM 36 is via alternate terminal connector (ATC) 42.

The bus controller of the BC/CU module 24 as may best be seen in FIG. 1, provides bus arbitration and clock control. Bus arbitration ensures that only one module is using a particular bus at one time. The system control unit of the BC/CU module is a microprocessor based system that can be considered the command and control portion of the entire mini-supercomputer system. It monitors the status of nucleus modules (CPU 0, CPU 1, main memory 22, BSS 26, ISBL 28 and UIOM 30) via a serial bus link gate array (SBLGA) 44 and the status of the I/O modules via a K-bus controller 46. Through these two serial buses, the system control unit of the BC/CU can also download or upload the module microcode, turn a module on or off line, request the module to execute its on-board diagnostics, etc. The system control unit communicates all this system data to the human data processing manager or system operator via a system control station 48. It includes a CRT, a keyboard and a menu driven interface that enable the system operator to monitor the status of the entire mini-supercomputer system, perform system configuration, power up and power down, system diagnostic routines, as well as maintain the system control unit software and the nucleus module microcode. The BC/CU module also monitors environmental conditions such as power supplies and temperature and periodically reports its findings to the system operator. Remote access to the mini-supercomputer system is also controlled at the system control station 48.

CPU 0 and CPU 1 as may best be seen in FIG. 1, may each comprise a set of five printed circuit (PC) boards with an optional two board set arithmetic accelerator. Each CPU is comprised of an instruction unit, an execution unit and a microstore and instrumentation unit. These CPU units preferably consist of emitter-coupled gate array logic (ECL) integrated circuits in order to achieve a very high operating speed, e.g. with a 52 nanosecond clock cycle. They also preferably make extensive use of state of the art large scale integration (LSI) and very large scale integration (VLSI). Each CPU has a private cache memory, a hardware virtual memory manager and a five-stage instruction pipeline with overlapped instruction decoding and execution. Pipelining involves overlapping transactions on the system bus. The optional arithmetic accelerator provides hardware support for both scalar and vector floating-point operations sustaining a performance rate, for example, of forty million floating point operations per second (Mflops) per CPU.

By way of further illustration, each port of the system bus 20 as may best be seen in FIG. 1, may be comprised of a primary slot and a secondary slot, for a total of forty-two slots. Two of the slots may be dedicated to the BC/CU 24 and the BSS 26, and fourteen others reserved for board sets that make up CPU 0 and CPU 1. The remaining slots may be used for boards that make up the main memory 22, the ISBL 28, and the UIOM 30. There may be multiple ISBLs and UIOMs connected to the system bus 20.

The structure of the system bus 20 as may best be seen in FIG. 1, consists of several major fields of multiple lines which carry message and data transfers, and control signals for intra or inter-system control. These fields include a memory address bus, a data bus, an expanded data bus, and an individual control signal bus. Parity bits are associated with all of these bus fields. By way of example, a 30-bit memory address field may provide the facility for addressing four billion bytes (four gigabytes) of main memory. A 64-bit data bus field may provide the main transmission path for data between the main memory 22 and the other system modules. A system bus transfer (32-, 64-, or 128-bits wide) may utilize one or more fields depending on the type of transfer and all transfers are preferably done in parallel. Thus all memory read transfers always result in a memory data return transfer of 64-bits. Data return transfers and memory writes of 128-bits may be achieved with the expanded data bus. By way of further example, the system bus may consist of two-hundred and seventy-four separate signals.

Further details of the system bus 20 may be found in the aforementioned co-pending U.S. patent application Ser. No. 07/173,212, filed concurrently herewith for Bus Structure for Overlapped Data Transfer to Thomas, which is assigned to Gould Inc. The subject bus data monitoring and capturing system is referred to in said application as "snapshot unit 261". The entire disclosure of said application is specifically incorporated herein by reference.

B. The Bus Data Monitoring and Capturing System

The primary function of the bus data monitoring and capturing system (BSS 26 in FIG. 1) is troubleshooting or debugging of the nucleus modules of the computer system which are connected to the ports on the system bus 20. In the preferred embodiment the BSS 26 can monitor one-hundred and forty of the two-hundred and seventy-four system bus signals at any one time upon selection of one of four possible formats. The BSS 26 can capture system bus data continuously until its data buffer is full, until a specified smaller amount of data has been captured, or until a preselected event occurs. Data capture can also be triggered by predetermined events. The BSS 26 can issue a break-point generated sync pulse for an oscilloscope, as well as stopping or single-stepping the system clocks to aid in debugging. The BSS 26 also continuously checks system bus parity and can generate a parity error signal for the memory address field, data field, and expanded data field, on the cycle immediately following the detection of an actual parity error. Backplane signals can also be monitored by the BSS 26.

Figure 2:
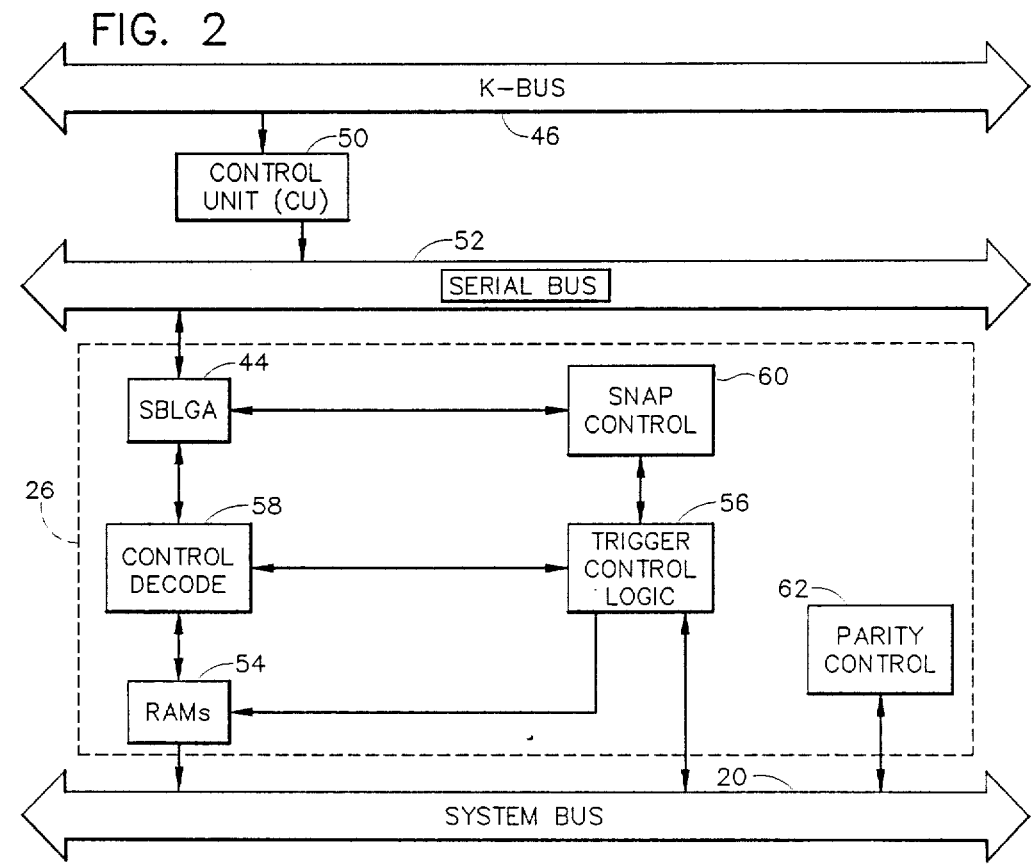
FIG. 2 is an overall block diagram of a preferred embodiment of the bus data monitoring and capturing system of the present invention.

FIG. 2 is an overall block diagram of a preferred embodiment of the bus data monitoring and capturing system (BSS) 26 of the present invention. It is controlled by the system control unit (CU) 50 via the SBLGA 44 and serial bus 52. The CU 50 forms part of the combined bus controller and system control unit (BC/CU) 24 as may best be seen in FIG. 1. The CU 50 monitors the status of the I/O modules via K-bus controller 46 (FIG. 2).

The system bus 20 is physically located at the backplane of the mini-supercomputer illustrated in FIG. 1. The BSS 26 must interface directly to the system bus 20 in order to achieve the desired monitoring and capturing capabilities. Two-hundred and fifty-six lines form the system bus, along with eighteen other lines that are wire-wrapped to the backplane are connected directly to the BSS 26. Signals on these lines are captured in a series of RAMs 54 as may best be seen in FIG. 2, under the direction of a trigger control logic 56. The trigger control logic is in turn controlled by the CU 50 via the SBGLA 44, a control decode 58 and a snap control 60. The information captured in the RAMs 54 can be monitored by the CU 50 at a later time when analysis of the same is desired. The BSS 26 can generate a parity error signal on the cycle following the detection of the actual parity error by parity control 62. Self-testing of the BSS 26 itself can be performed by the CU 50 via the SBLGA 44 by placing the BSS in an off-line condition. It should be understood that the BSS is not required for normal operation of the general purpose mini-supercomputer system illustrated in FIG. 1. The BSS functions primarily as a diagnostic tool.

Figure 6:
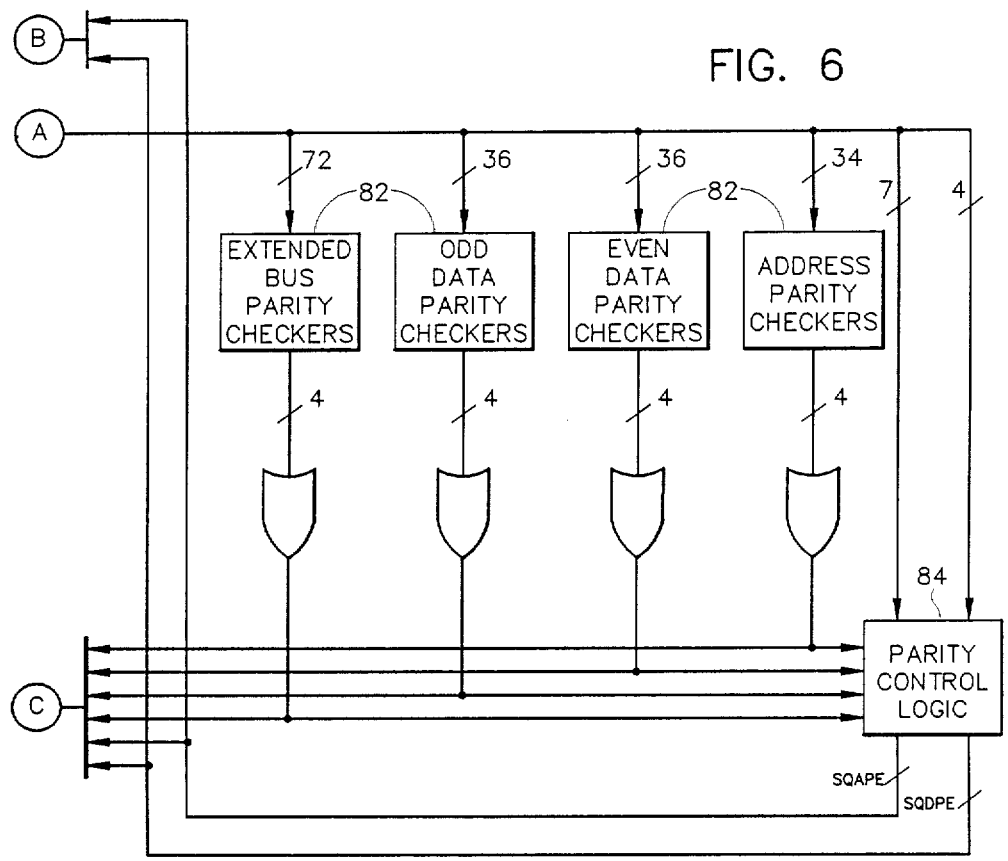
FIG. 6 is a block diagram of the parity checkers and parity control logic of the preferred embodiment of the bus data monitoring and capturing system of the present invention. The leads marked A, B and C connect to the correspondingly labeled leads of FIG. 3.

FIG. 3 is a detailed block diagram of a preferred embodiment of the BSS 26 except for the parity checkers and parity control logic which are illustrated in the block diagram of FIG. 6. The leads marked A, B and C in FIG. 3 connect to the correspondingly labeled leads in FIG. 6. In FIGS. 3, 6 and 8–12 the numbers next to the various lines interconnecting the boxes indicate the number of bits in the codes or characters being transmitted. A clock logic circuit 64 receives a set of first level trigger and latch clock signals from the K-bus controller 46. These positive and negative clock signals are taken through line receivers and then through a series of drivers to create third level clock signals for the logic components of the BSS 26 hereafter described.

The SBLGA 44 as may best be seen in FIG. 3, is preferably an MCA1200 ECL gate array chip. It provides the hardware interface with the serial bus signals coming from the system bus 20. Its major function in the BSS 26 is to receive serial data from the CU 50 and convert it to parallel data by way of a 16-bit parallel output port. Likewise, the 16-bit parallel input port on the SBLGA 44 receives parallel data from the snapshot RAMs 54, or other components of the BSS 26, and converts it to serial data to be sent back to the CU 50 via the serial bus 52 as may best be seen in FIG. 2.

The bit patterns are received on the BSS 26 as either 8-bit function codes or 16-bit data codes. FIGS. 4 and 5 set forth a representative sequence of the function and data codes. The function codes mainly provide for diagnostic reading and writing of the snapshot RAMs, presetting counters, setting the start and stop data acquisition enables, steering multiplexers, single stepping the clocks, clearing or setting trigger RAM breakpoints, selecting the mode of operation for the BSS 26, and setting or re-setting clocks. The function codes are decoded and used for control or to capture and steer the data codes. The data codes contain the actual data to be written into the trigger or snapshot RAMs 66, or flags which are of help in registers 68 to control the hardware. Table I at the end of this detailed description provides an explanation of the codes set forth in FIGS.

4 and 5. Each of the function and data codes is related to the functional logic block which it controls.

The function and data codes coming from the parallel output port of the SBLGA 44 are captured in separate hold registers 68. Once the function and data code hold registers are loaded they retain that set of data until another function or data code is issued. The 8-bit data codes, coming from the data hold register, are decoded by a set of function decoders 70 into a format acceptable to a control logic circuit 72. Some functions are decoded and are used to steer or capture the corresponding 16-bit data patterns coming from the data hold registers. Simultaneously, the 16 data bits from these data hold registers are "daisy-chained" across the inputs of 2:1 bus interface multiplexers (muxes) 74 in order to simulate data coming in off the system bus 20.

The control logic circuit 72 as may best be seen in FIG. 3, receives the decoded signals from the function decoders 70 and uses these signals to control the overall operation of our system for monitoring and capturing bus data which is illustrated as the BSS 26 in FIG. 1. The bus interface muxes 74 are, as previously indicated, comprised of 2:1 multiplexers which select either two-hundred and seventy-four signals from the backplane of the mini-supercomputer or 16 bits from the data hold registers 68 which are daisy-chained across the interface muxes. This path is used for diagnostics. The outputs of the bus interface muxes 74 are steered to the inputs of snapshot latches 76, snapshot muxes 78 and 79, data muxes 80, and to the parity checkers 82 and parity control logic 84 illustrated in FIG. 6.

Figure 7:
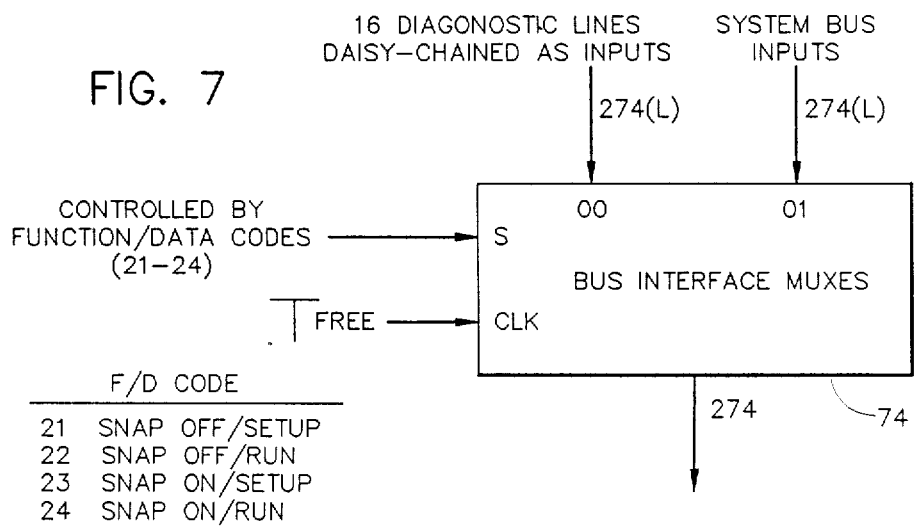
FIG. 7 illustrates the software command structure for the bus interface multiplexers of the preferred embodiment.

The software commands that control the bus interface muxes 74 are the function/data codes 21 through 24 listed in Table I. Referring to FIG. 7, these codes represent the combination of either a SNAPOFF or SNAPON command with either a SETUP or RUN command. The SNAPOFF command steers the bus interface muxes toward the data hold inputs and disables the bus driver/receivers 86 as may best be seen in FIG. 3. The SNAPON command steers the bus interface muxes toward the system bus inputs and enables the bus driver/receivers. The SETUP command allows format changes to occur in the BSS 26 without inducing false triggers. The RUN command allows the BSS 26 to START/STOP data acquisition or stop clocks, according to the manner in which the BSS 26 has been set up.

Figure 8:
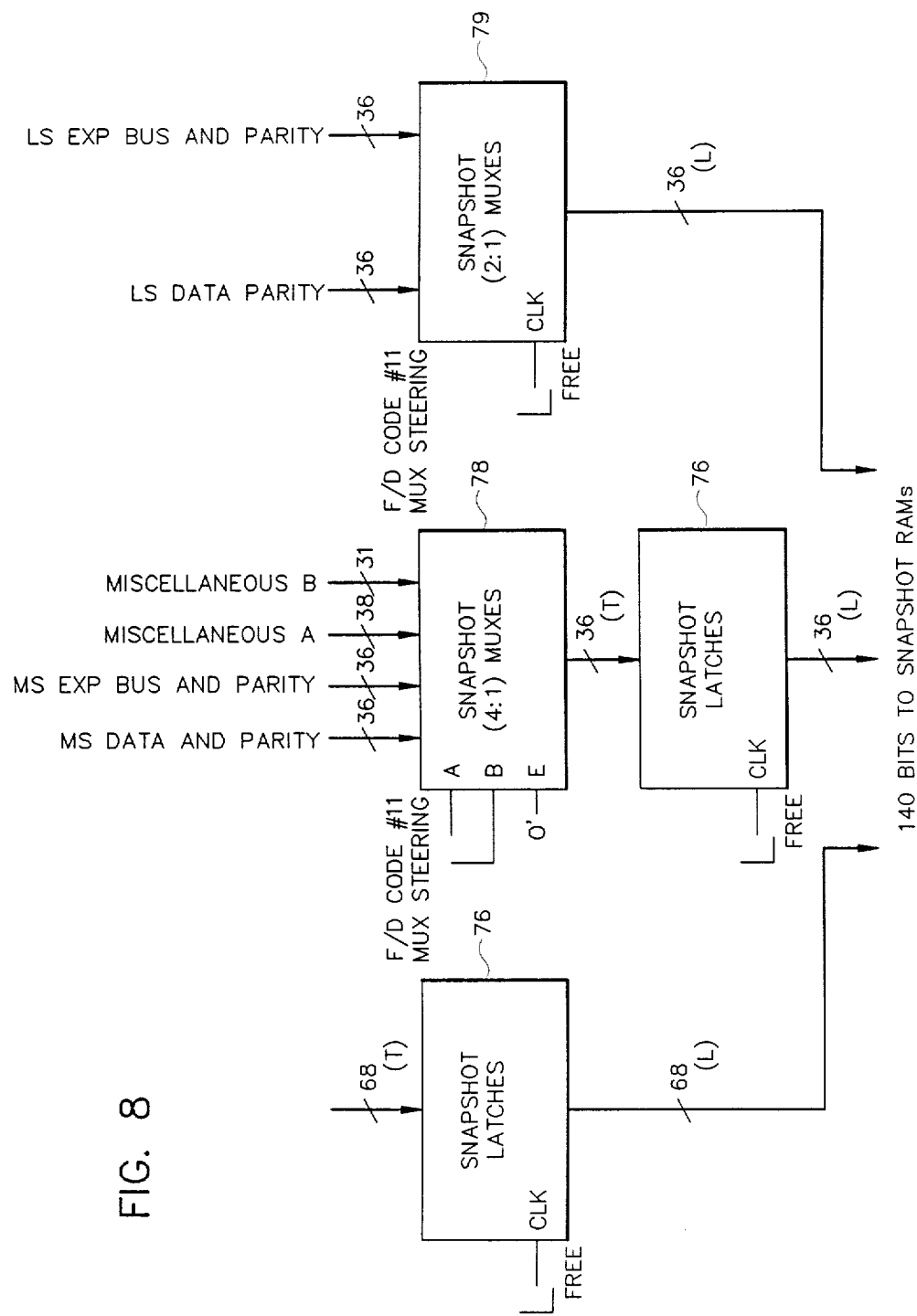
FIG. 8 illustrates the operation of the snapshot latches and multiplexers of the preferred embodiment.

The operation of the snapshot latches 76 and snapshot muxes 78 as may best be seen in FIG. 3, will be more fully understood by way of reference to FIG. 8. These latches and muxes are selected to show exactly what is occurring on the system bus 20. There are sixty-eight output bits from the bus interface muxes 74 consisting of the OPCODE, MEMTX, ADDR, SRCAD, and DESAD fields. These fields are sent to the snapshot RAMs 44 as data-in. These RAMs may be 4K by 140 in size. Another set of outputs from the bus interface muxes are directed to the 4:1 multiplexers (snapshot muxes) 78. This path contains thirty-six bits of MS Data Bus, thirty-six bits of MS Expanded bus, thirty bits of Miscellaneous A and thirty-one bits of Miscellaneous B. One of these four inputs is selected via the snapshot latches 76 and the output is sent to the snapshot RAMs 54 (data-in path). These RAMs may also be 4K by 140 in size. The 2:1 snapshot muxes 79, which provide the third input to the snapshot RAMs, receive thirty-six bits from both the data bus and expanded data bus.

The aforementioned outputs from the bus interface muxes 74 are supplied to the respective snapshot muxes 78 and 79 when either the backplane signals or the diagnostic signals are selected. The snapshot muxes can be controlled through function code 11 (Mux Steering), which allows selection of the desired format. These formats are set forth in Table II at the end of this detailed description. At any one time, the BSS 26 can only capture one-hundred and forty of the two-hundred and seventy-four backplane signals.

Figure 9:
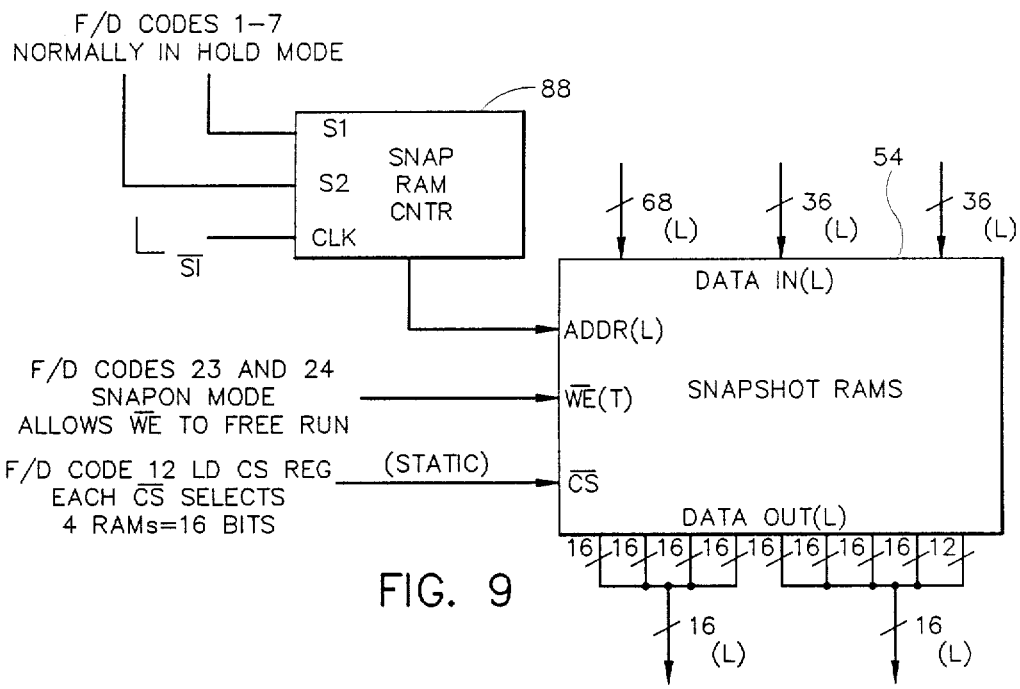
FIG. 9 illustrates the operation of the snapshot RAMs of the preferred embodiment.

Referring to FIG. 9, the snapshot RAMs 54 may comprise a series of 4K by 4 RAM chips. The data-in to the snapshot RAMs comes directly from the snapshot latches 76 and snapshot muxes 78 and 79 (FIG. 3). The RAM address is a latched signal coming from the snapshot RAM counter 88 (FIG. 9). This counter can be controlled using function data codes 1 through 7, otherwise it stays in a hold mode. The write enable signals (WE) are low true, triggered signals which are controlled by function/data codes 23 and 24. The SNAPON command allows the WEs to free run upon the occurrence of a start data acquisition condition, thus capturing data every cycle. Function/data codes 4 through 6 are the diagnostic write commands. Only one RAM location can be written per command. The chip select commands for the snapshot RAMs are loaded into a register in the control logic 72 as may best be seen in FIG. 3, via the function data code 12. There are nine chip select commands, each selecting four of the snapshot RAMs at a time (16 bits). There is one CS bit which only selects three RAMs (12 bits). The snapshot RAM outputs are wire-ORed into two separate groups of 16 bits. The data-out bits of the RAMs are latched signals. Table III set forth at the end of this detailed description lists the function/data codes that make up the free running mode and diagnostic mode of the snapshot RAMs 54.

Figure 10:
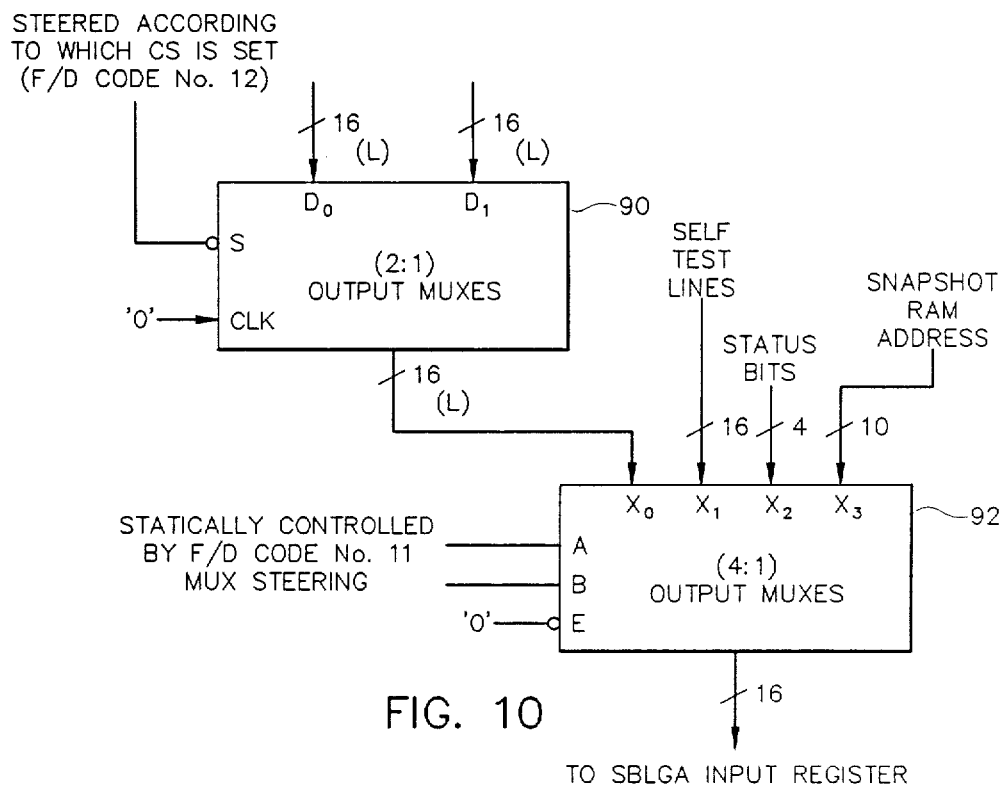
FIG. 10 illustrates the operation of the output multiplexers of the preferred embodiment.

Referring to FIGS. 3 and 10, the 2:1 output muxes 90 select either of the two sets of wire-ORed bits coming out of the snapshot RAMs 54. These muxes are steered according to which snapshot RAM CS commands are set (function/data code 12). The 16 bits from these 2:1 output muxes 90 are taken to one of the inputs of the 4:1 output muxes 92. The other inputs to the 4:1 output muxes are sixteen self-test lines, four status bits, and the snapshot RAM address. The output muxes 92 are steered by function/data code 11 (mux steering). Thus, the outputs from these 4:1 muxes 92 go back to the input port of the SBLGA 44. This creates the path by which the BSS 26 sends information back to the CU 50 (FIG. 2) via the SBLGA 44.

The data muxes 80 (FIGS. 3 and 11) include 2:1, 4:1 and 8:1 types. The 2:1 data muxes allow either the thirty-bit address field or the eleven-bit DESAD field to be selected. The 4:1 data muxes allow selection of either the seven-bit OPCD, eight-bit MEMTX, two-bit STATUS, or two-bit APE & DPE. The 8:1 data muxes allow selection of one of the eight indicated inputs. The data muxes are controlled through function/data code 11 (mux steering). They select the fields which address the trigger RAMs 66 after they have been steered through 2:1 trigger muxes 94. The trigger muxes are also steered by function data code 11. These muxes have a latch clock to make the addressed lines latch signals. To read the trigger RAMs 66, the trigger muxes 94 must be steered towards the inputs coming from the data muxes 80. However, to write into the trigger RAMs, the trigger muxes must be steered towards the input of a trigger counter 96. Function/data code 8 can be used to preset the trigger counter. Any desired location in the trigger RAMs 66 can be addressed through the trigger counter 96 in order to set or clear a trigger. Thus the outputs of the trigger muxes 94 serve as address lines to the trigger RAMs 66. Table IV at the end of this detailed description lists the single triggers and combination triggers used in controlling the data muxes, trigger muxes and trigger counter.

Figure 12:
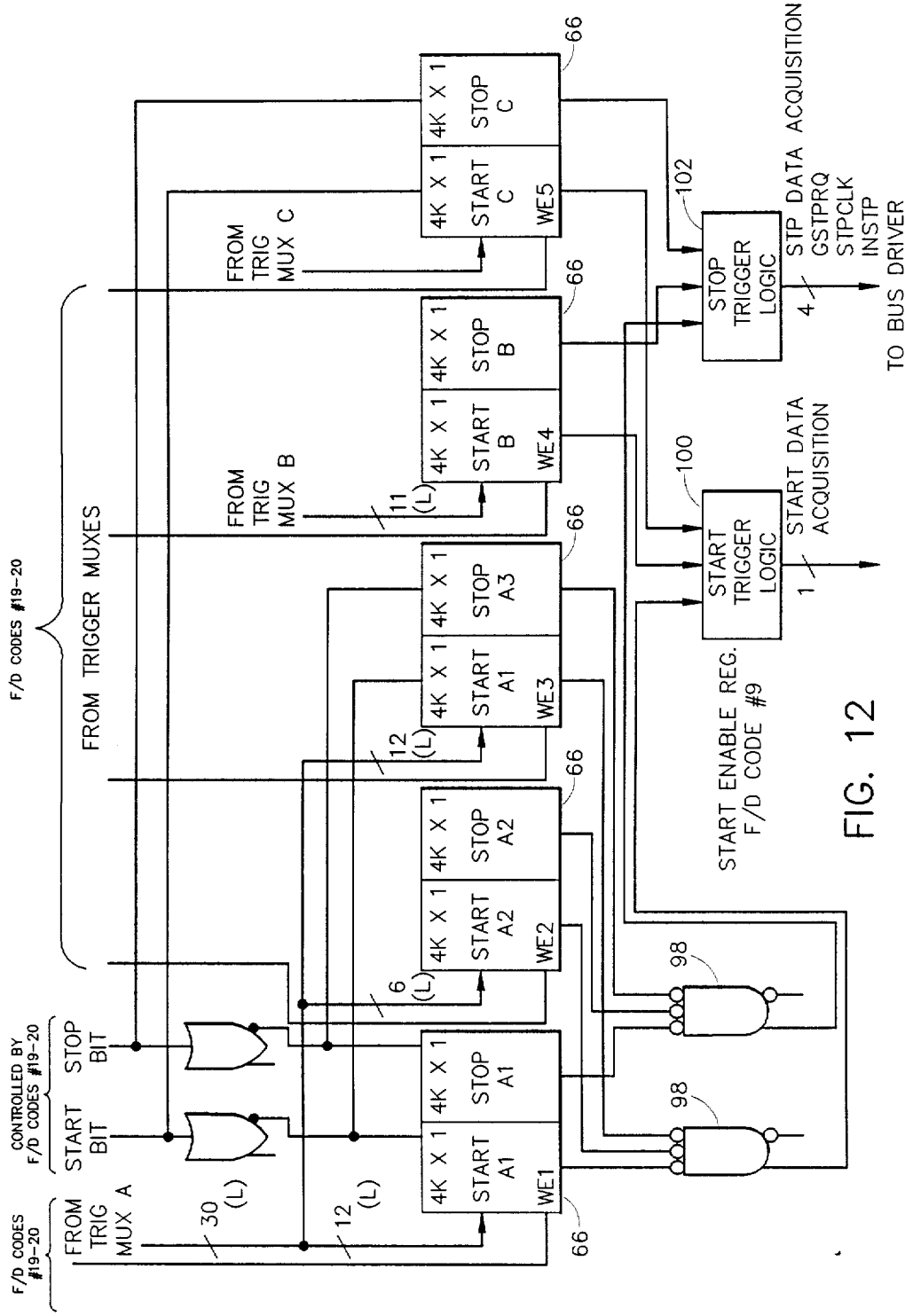
FIG. 12 illustrates the operation of the trigger RAMs of the preferred embodiment.

Referring to FIG. 12, the trigger RAMs 66 preferably are made up of 4K by 1 RAM chips which provide 4K of memory for the trigger logic. The largest field used to address the trigger RAMs is the 30-bit address field. Therefore, three sets of RAMs must be used to handle 30-bits of addressing capability. The most significant 12 bits are handled by RAMA1, the next 6 bits by RAMA2, and the least significant 12 bits are handled by RAMA3. Each set of trigger RAMs includes a start RAM and a stop RAM. There is also a B and C set of RAMs. The B trigger RAMs use 11 bits of addressing and the C trigger RAMs use 8 bits of addressing. The trigger RAMs can be programmed using function/data codes 19 and 20. Function/data code 19 allows individual addresses to be set or cleared in the trigger RAMs. Function/data code 20 allows all the trigger RAMs to be cleared or set simultaneously.

The outputs of the trigger RAMs 66 as may best be seen in FIG. 12 are coupled through gates 98 to a start trigger logic circuit 100 and a stop trigger logic circuit 102. The output of the logic circuit 100 is used to start data acquisition. The output of the logic circuit 102 is connected to bus drivers 86 as may best be seen in FIG. 3. The combination and single triggers require the logic circuits 100 and 102. As previously indicated, one of the inputs to this set of logic circuits is the outputs of the trigger RAMs 66. The enables for allowing or inhibiting the triggers to occur are controlled by function/data codes 9 and 10. Function/data code 9 loads the start enables into a register which is then gated with the start trigger RAM outputs. Similarly, function/data code 10 loads the stop enables into a register which is gated with the stop trigger RAM outputs. Depending upon which triggers are enabled, the proper starting or stopping data acquisition or stop clocks will be activated. The start and stop data acquisition logic has as inputs the output from the combination and single trigger logic. The stop data portion has another input which is supplied from the snapshot RAM address counter 88 as may best be seen in FIG. 3 when it is enabled. Both start and stop data acquisition provide an output that is supplied to the RAM control logic 72. The stop data acquisition has two additional outputs which are supplied to a trigger and go through the bus driver logic 86. These are the stop clock (STPCLK) and global stop request (GSTPRQ) signals.

FIGS. 13 and 14 list the signals which are decoded in the parity control logic 84 as may best be seen in FIG. 6 and the bus associated with each signal. There is a parity bit associated with each byte of the data, address, and expansion data buses. These bits are generated by the device driving bus. The 64-bit expansion bus and 8 parity bits, 64-bit data bus and 8 parity bits, and 30-bit address bus and 4 parity bits are runt through respective sets of parity checkers 82. They check for ODD parity on the bus, i.e. there should be an odd number of ones in the 8-bit byte plus parity bit in order for there to be no parity error. The parity control logic decodes the type of transfer occurring on the bus and enables the appropriate parity checker output to go through the bus drivers. Two types of parity errors are generated, namely, a data parity error and an address parity error. These signals are enabled according to the type of bus transfer detected by the parity control logic 84. This causes the parity error signal to be generated on the cycle immediately following the actual parity error detection.

The bus drivers 86 as may best be seen in FIG. 3 drive the parity error signals and the clock signals onto the system bus 20. There are three separate bus drivers. The first drives and receives the serial marker bit signal and the serial data bit signal at all times. The second receives the global stop request (GSTPRQ), stop clock (STPCLK), and instrumentation stop clock signals, and drives these same signals only when the system is ON-LINE and in RUN MODE. The third bus driver receives the address parity error signals and data parity error signals and drives them only when the bus monitoring and capturing system (BSS) 26 is ONLINE and in RUN MODE.

TABLE I

| FUNCTION CODE NUMBER | DESCRIPTION |
|---|---|
| 0 | NOP |
| 1 | Diag Hold and Read Snap RAM. Loads the SBLGA input registers with 16 bits of output from the Snapshot RAMs while keeping the RAM PC at the same address. |
| 2 | Diag INC and Read Snap RAM. Loads the SBLGA input registers with 16 bits of output from the Snapshot RAMs. It increments the RAM PC before it reads the RAM output. |
| 3 | Diag DEC and Read Snap RAM. Loads the SBLGA input registers with 16 bits of output from the Snapshot RAMs. It decrements the RAM PC before it reads the RAM output. |
| 4 | Diag Hold and Write Snap RAM. Writes 16 bits of valid data (from the data code) into the Snapshot RAMs at the current RAM PC address. |
| 5 | Diag INC and Write Snap RAM. Writes 16 bits of valid data (from the data code) into the Snapshot RAMs after the RAM counter has been incremented one address. |
| 6 | Diag DEC and Write Snap RAM. Writes 16 bits of valid data (from the data code) into the Snapshot RAMs after the RAM counter has been decremented one address. |
| 7 | Preset Snap RAM Counter. When decoded, loads the 12 valid bits in the corresponding data code field into the Snapshot RAM counter which becomes the current address of the Snapshot RAMs. |
| 8 | Preset Trigger RAM counter. When issued, Loads the 12 valid bits in the Corresponding data code field into the Trigger RAM counter. |
| 9 | Start Data Acq Enables. Loads a register with all different combinations of start data acquisition enable bits. The valid bits are in the data code field, bits 8 through 15. Bit 8 - Uncond. Start. Causes an Uncond. Start Data Acq as soon as the board is put in Run mode. Bit 9 - Single C. The enable bit for Start Data Acq upon the occurrence of a certain address or destination field trigger. Bit 10 - Single B. |

TABLE I-continued

Figure 11:
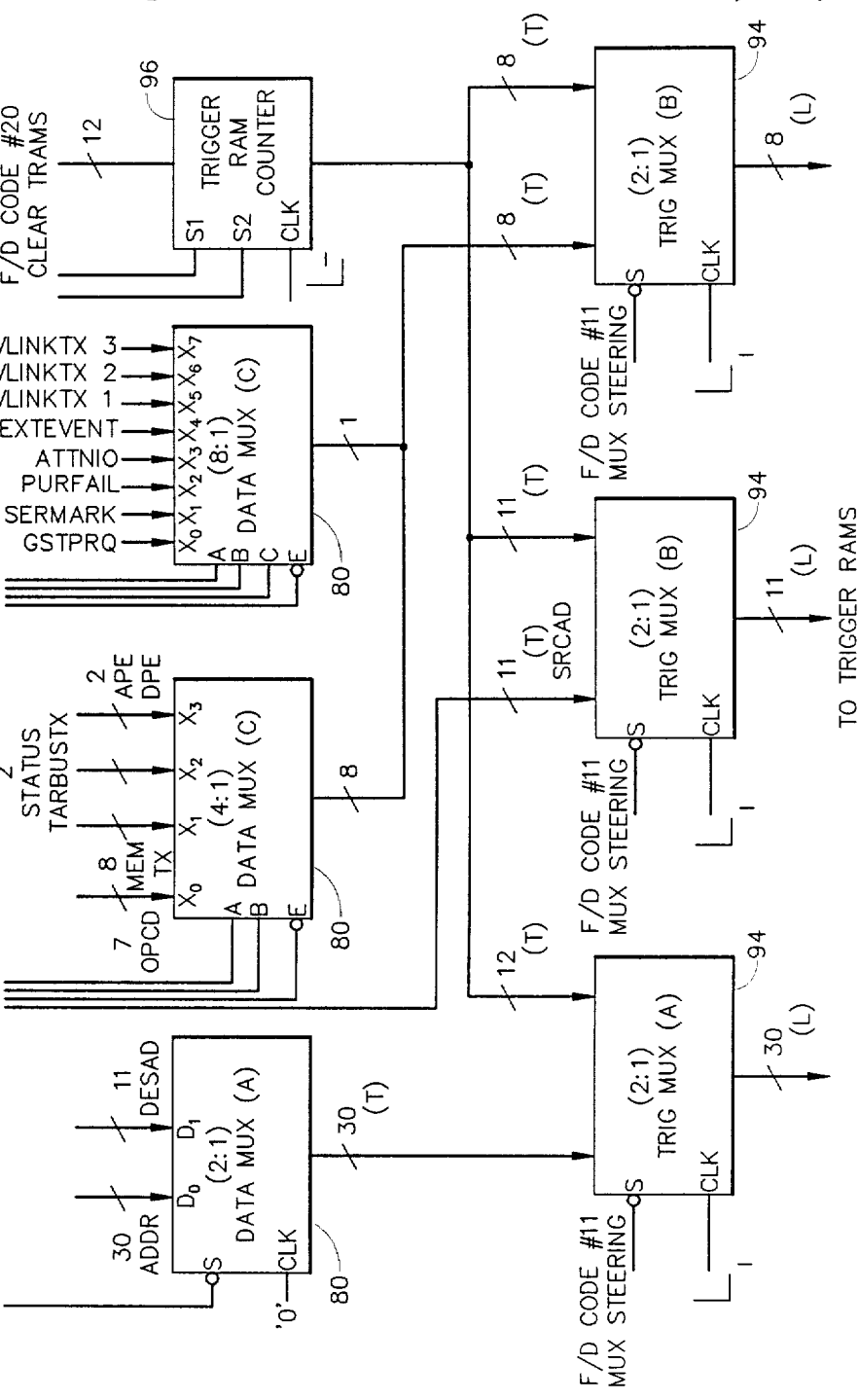
FIG. 11 illustrates the operation of the data multiplexers, trigger multiplexers and trigger counter of the preferred embodiment.

| FUNCTION CODE NUMBER | DESCRIPTION |
|---|---|
|  | The enable bit for Start Data Acq upon the occurrence of a certain source address trigger. Bit 11 - Single A. The enable bit for Start Data Acq upon the occurrence of any one of the following trigger fields: MEMTX, OPCD, TARBUSTX, STATUS, APE, DPE, GSTPRQ, SERMARK, PWRFAIL, ATTNIO, EXTEVENT, ADVLNKTX. Bit 12-15 - Enable bits for Start Data Acq on any combination of fields given above for bits 8 through 11. |
| 10 | Stop Data Acq Enables. Loads a register with all different combinations of Stop Data Acq Enable bits. The valid bits are in the data code field bits 2 through 15. Bits 9 through 15 in the data code are the same as those of the Start Data Acq Enables. However, the Stop Data Acq Enables must be used in combination with one or more of the data code bits 2 through 8. Note that some of the enable bits are HI true and some are LO true. Bits 9-15 - Single A; Single B; Single C; AND A,B,C; AND B,C; AND A,C; AND A,B. Must be used in combination with bit 5 (Stop Data Acq) + bit 7 (GSTPRQ) + bit 8 (STPCLK). Bits 5, 7, and 8 and LO true. Bit 8 - STPCLK (LO true) Must be used in combination with a single or AND Stop Enable. May be used in combination with bit 2 (window to infinity) or bit 3 (window to RAM full). May NOT be used in combination with bit 4 (Stop Data Acq on RAM full). May be used in combination with bit 7 (GSTPRQ). May be used in combination with bit 5 (Stop Data Acq). Bit 7 - GSTPRQ (LO true) Same as bit 8, STPCLK. Bit 6 - INSTP (LO true) This bit should always remain HI. Bit 5 - Stop Data Acq (LO true) Must be used in combination with a single or AND Stop Enable. May be used in combination with bit 2 (window to infinity) or bit 3 (window to RAM full). May NOT be used in combination with bit 4 (Stop Data Acq on RAM full). May be used in combination with bit 7 (GSTPRQ). Bit 4 - Stop Data Acq on RAM full (HI true) When the RAM is full, only Stop Data Acq will be issued to the status register. May be used in combination with bit 8 (STPCLK). Bit 3 - Window to RAM full (HI true) When the RAM is full, only Start Data Acq will be issued to the status register and the start enable register will be reset. May be used with Stop Data Acq and STPCLK simultaneously while windowing. Or Stop Data Acq and GSTPRQ. Or Stop Data Acq, GSTPRQ, and STPCLK. And the status register will be loaded with Stop Data Acq and /or STPCLK or GSTPRQ. Must be used in combination with a single or AND Stop Enable. When the clock is released, snapping resumes on the next Start Data Acq condition and continues until the next Stop condition or until the RAM is full. Bit 2 - Window to infinity (LO true) May be used with Stop Data Acq and STPCLK. Or Stop Data Acq and GSTPRQ. Or Stop Data Acq, STPCLK AND GSTPRQ. Only a STPCLK will be reported to the status register while windowing. When the clock is released, snapping resumes on the next Start condition. When an Unconditional Stop Data Acq is issued, a Stop Data ACQ is reported to the status register and the start enable register is reset. |
| 11 | Mux Steering Register. Steers all the multiplexers on the BSS 26. The valid data code bits (3 through 15) are loaded in a register so that the steering of all muxes remains static until they are altered by reissuing the same function code with the desired data code. Bits 3,4 - Steer the 4 to 1 output muxes shown in FIG. 10. Bits 5,6 - Steer the 4 to 1 snapshot muxes shown in FIG. 8. Bit 7 - Steers the 2 to 1 snapshot muxes All these data muxes are shown in FIG. 11. |
| 12 | Load Snap RAM CS Reg. Selects the desired Snapshot RAM bank to be written to or read from. Each RAM bank contains 16 bits. When the BSS 26 is set up for starting data acquisition, the CS register should have all CSs enabled |

TABLE I-continued

| FUNCTION CODE NUMBER | DESCRIPTION |
|---|---|
| | (LO true) so that 140 bits of data will be captured each cycle when data acquisition begins. However, when reading the data out of the Snapshot RAMs, only one CS may be enabled at any time since only 16 bits of data can be loaded into the SBLGA. When the Load Snap RAM CS Reg function is issued, it loads the corresponding valid data bits (7 through 15) into a register so that the chip selects remain static until they are altered by reissuing the same function code with new data. |
| 13 | 83 Unconditional Stop Data Acq. A function code, with no corresponding data code that forces a Stop Data Acq condition. It is also the only way to break out of a data acquisition loop when the window to infinity enable is valid because a window to infinity allows a Start Data Acq and a Stop Data Acq to occur repeatedly. |
| 14,15 | Single Step STPCLK and Single Step GSTPRQ. |
| 16,17,18 | Spares. |
| 19 | Clear/Set Start/Stop Breakpts. Set a bit in the trigger RAM at a specified address which is to be a breakpoint for either stopping data acquisition or stopping the clocks or both. The corresponding valid data bits are 0 through 4 and 11 through 15. Bits 0,1 - (LO true) Serve as chip selects for the start RAMs and the stop RAMs. Bits 2,3 - (HI true) Are the actual Data In to the trigger RAMs. Bits 11-15 - (LO true) Serve as write enables for the trigger RAMs. Each write enable goes to a start and a stop RAM. (See FIG. 12.) EXAMPLE: To set a Stop Breakpt at SRCADR = 0003 H 1. Snap Off/Set Up Mode 2. Mux Steering 3. Preset trigger counter to 0003 H 4. Set Stop Breakpt 5. Mux Steering 6. Snap On/Run Mode |
| 20 | Clear/Set All Trigger RAMs. Clears or sets any one or all trigger RAMs from address 0 to the terminal count (4k). The trigger counter must be preset to 0, the trigger muxes must be steered toward the TCNTR inputs, and the output muxes must be steered towards the status inputs. When the function and data codes are issued, the T-Counter increments until the terminal count. Then a terminal count signal is sent to the gate array status register ending the process. (See FIGS. 11 and 13). |
| 21 | Snap Off/Set Up |
| 22 | Snap Off/Run |
| 23 | Snap On/Set Up |
| 24 | Snap On/Run These function codes place the BSS 26 in a known state depending on the usage desired. For instance: 54 Snap Off - Steers the bus interface muxes toward the SBLGA inputs (the diagnostic path), disables the bus drivers so that the BSS 26 will not drive bus signals, and inhibits the BSS 26 from receiving STPCLK from the bus. Snap On - Steers the bus interface muxes towards the System Bus inputs and enables the bus drivers. Setup - Allows format changes to occur on the BSS 26 without incurring false triggers. It also blocks STPCLK from being received from the bus. Run - Allows the BSS 26 to start and stop data acquisition or start and stop the clocks according to the way the BSS 26 is set up. |
| 25 | Spare. For use if necessary. |
| 26 | Load Snap Addr. Cntr (No corresponding data codes.) Reads the value of the Snapshot RAM address counter. |
| 27 | Load 16 Self Test Lines. Reads the value of 16 miscellaneous signals that determine the present state of the board. |
| 28 | Reset all STPCLKS. Releases the BSS 26 from driving any STPCLK signal. |
| 30 | Set GSTPRQ. Causes the BSS 26 to continuously drive the GSTPRQ signal. |
| 31 | Set STPCLK. Causes the BSS 26 to continuously drive the STPCLK signal. |
| 32 | Spare. |

TABLE II

SNAPSHOT FORMATS
F/D CODE NO. 11 (MUX STEERING) -
SELECTS THE FORMAT DESIRED

| Format 0 - | 68 Bits | 30 ADDR, 11 SCRAD, 11 DESAD, 8 MEMTX, 7 OPCD, 1 BLCPUTX+ |
|---|---|---|
| | 36 Bits | MS Data Bus & Parity |
| | 36 Bits | LS Data Bus & Parity |
| Format 1 - | 68 Bits | 30 ADDR, 11 SCRAD, 11 DESAD, 8 MEMTX, 7 OPCD, 1 BLCPUTX+ |
| | 36 Bits | MS Expanded Bus & Parity |
| | 36 Bits | LS Expanded Bus & Parity |
| Format 2 - | 68 Bits | 30 ADDR, 11 SCRAD, 11 DESAD, 8 MEMTX, 7 OPCD, 1 BLCPUTX+ |
| | 36 Bits | LS Data & Parity |
| | 30 Bits | Miscellaneous A |
| Format 3 - | 68 Bits | 30 ADDR, 11 SCRAD, 11 DEDAD, 8 MEMTX, 7 OPCD, 1 BLCPUTX+ |
| | 36 Bits | LS Data & Parity |
| | 31 Bits | Miscellaneous B |

TABLE III (FREE RUNNING MODE) SNAP ON/RUN MODE

TABLE III-continued

| | | |
|---|---|---|
| 1 F/D Code No. 21 | Snap Off/Setup Mode | |
| 2 F/D Code No. 11 | MUX Steering - Select Proper Format | |
| 3 F/D Code No. 12 | Load CS Reg - Set All CSs to that entire RAM is written | |
| 4 F/D Code No. 7 | Preset Counter to Desired Address | |
| 5 F/D Code No. 24 | Snap On/Run Mode | |
| DIAGNOSTIC MODE SNAP OFF/RUN OR SETUP MODE | | |
| A. DIAGNOSTIC WRITE SNAP RAM | | |
| 1 F/D Code No. 21 | Snap Off/Setup Mode | |
| 2 F/D Code No. 7 | Preset Snap Counter | |
| 3 F/D Code No. 12 | Load CS Reg | |
| 4 F/D Code No. 11 | MUX Steering - Select Proper Format | |
| 5 F/D Codes Nos. 4-6 | Diag Writes | |
| B. DIAGNOSTIC READ SNAP RAM | | |
| 1 F/D Code No. 21 | Snap Off/Setup Mode | |
| 2 F/D Code No. 7 | Preset Snap RAM CNTR | |
| 3 F/D Code No. 12 | Load CS Reg - only 1 CS can be enabled since only 16 bits can be read at one time | |
| 4 F/D Codes Nos. 1-3 | Diag Reads | |

TABLE IV

START & STOP TRIGGERS

| SINGLE TRIGGERS | | |
|---|---|---|
| ADDR | 30 | Bits |
| MEMTX | 8 | Bits |
| OPCD | 7 | Bits |
| DESAD | 11 | Bits |
| SCRAD | 11 | Bits |
| STATUS | 1 | Bit |
| PWRFAIL | 1 | Bit |
| GSTPRQ | 1 | Bit |
| APE | 1 | Bit |
| DPE | 1 | Bit |
| EXTEVENT | 1 | Bit |
| ADVLINK TX | 3 | Bits |
| ATTNIO | 1 | Bit |
| SERIAL MARKER | 1 | Bit |
| UNCONDITIONAL STOP | 1 | Bit |
| UNCONDITIONAL START | 1 | Bit |
| TARBUSTX+ | 1 | Bit |
| COMBINATION TRIGGERS | | |
| (AND A,B ) DESAD AND SRCAD | | |
| (AND A,C ) ADDR AND MEMTX | | |
| (AND A,C ) DESAD AND OPCD | | |
| (AND B,C ) SRCAD AND OPCD | | |
| (AND A,B,C) DESAD AND SRCAD AND OPCD | | |
| (AND A,B,C) ADDR AND SRCAD AND MEMTX | | |

C. Conclusion

Having described a preferred embodiment of our system for monitoring and capturing bus data, it will be understood by those skilled in the art that our invention may be modified in both arrangement and detail. Accordingly, the protection afforded our invention should only be limited in accordance with the scope of the following claims.

What is claimed is:

1. A system for monitoring and capturing bus data in a digital computer having a CPU, a memory, at least one I/O module, each having a parity generator for generating a parity bit, a system bus for permitting communication between the CPU, memory and I/O module, the system bus including an address filed, a data field and a control field, each field including a plurality of lines for transmitting digital signals representing predetermined information, and a plurality of clock generators for timing the transmission of the digital signals on the lines, a buffer for storing information represented by the digital signals;

means for accessing the system bus and storing in the buffer the information represented by the digital signals transmitted on the lines of the fields during pre-selected time intervals; and means for analyzing the information stored in the buffer to locate faults in the computer without disrupting the normal operation thereof; and means for controlling operation of the clock commands of the plurality of clock generators.

2. A system as recited in claim 1, wherein comprises:

means for checking the parity of the predetermined digital codes accessed from the system bus to determine the existence of a parity error; and means for generating a parity error signal in response to each parity error determined by the parity checking means; and means for transmitting the parity error signal on the system bus.

3. A system as recited in claim 2, wherein the parity error signal generating means is generates the parity error signal on a clock cycle immediately following the determination of a parity error by the parity checking means.

4. A system as recited in claim 1, wherein the computer further has a control unit that transmits a plurality of function and data codes in serial form on a serial bus, and the accessing and storing means includes a serial bus link gate array connected to the control unit via the serial bus for receiving the serial function and data codes and converting them into parallel form.

5. A system as recited in claim 4, wherein the accessing and storing means further includes a decode logic circuit for receiving the parallel function and data codes from the serial bus link gate array and converting them into a plurality of steering commands that determine which of the selected fields and lines of the system bus are to be accessed.

6. A system as recited in claim 5, wherein the accessing and storing means further includes a plurality of bus interface multiplexers for transferring digital signals from the system bus to the buffer in response to the steering commands.

7. A system as recited in claim 6, wherein the means for analyzing the information stored in the buffer to be analyzed includes a plurality of output multiplexers for accessing information stored in the buffer and transmitting it to the serial bus link gate array in parallel form under preset conditions.

8. A system as recited in claim 1, and further comprising means connected to the accessing and storing means for storing information in the buffer continuously until the buffer is full, until a specified smaller amount of information has been stored, or until a specified event occurs.

9. A system as recited in claim 1, and further comprising means for diagnosing faults in the bus data monitoring and capturing system which are separate and apart from faults in the computer without disrupting the normal operation of the computer.

10. A system for monitoring and capturing bus data in a digital computer having a CPU, a memory, at least one I/O module, each having a parity generator for generating a parity bit, system bus for permitting communication between the CPU, memory and I/O module, the system bus including an address field, a data field and a control field, each field including a plurality of lines for transmitting digital signals representing predetermined information, and a plurality of clock generators for timing the transmission of the digital signals on the lines, comprising:
- a control unit that transmits a plurality of function and data codes in serial form on a serial bus;
- first interface means connected to the control unit via the serial bus for receiving the function and data codes and converting them into parallel form;
- means for receiving the parallel function and data codes from the first interface means and converting them into a plurality of steering commands that select the lines of the fields and a plurality of clock commands that start or stop one or more of the clocks; and
- a buffer for storing information represented by the digital signals;
- second interface means for transferring digital signals from the system bus to the buffer in response to the steering commands;
- trigger means connected to the buffer for starting or stopping the transfer of digital signals from the system bus to the buffer in response to the clock commands; and
- output means for connecting the buffer to the first interface means so that the information stored in the buffer may be accessed by the control unit in order to locate faults in the computer without disrupting the normal operation thereof.

11. A system as recited in claim 10, wherein the first interface means includes a serial bus link gate array.

12. A system as recited in claim 10, wherein the second interface means includes a plurality of interface multiplexers connected to the lines of the address, data and control fields of the system bus for transferring the digital signals transmitted on each of the lines and a plurality of snapshot multiplexers connected to the interface multiplexers for selecting predetermined ones of the lines for causing the information represented by the digital signals transmitted thereon to be stored in the buffer in response to the steering commands.

13. A system as recited in claim 10, wherein the output means includes a plurality of multiplexers for transferring information from the buffer to the first interface means under preset conditions.

14. A system as recited in claim 10, wherein the system further comprises:
- means for checking the parity of the predetermined digital codes accessed from the system bus to determine the existence of a parity error; and
- means for generating a parity error signal in response to each parity error determined by the parity checking means; and
- means for transmitting the parity error signal on the system bus.

15. A system as recited in claim 14, wherein the parity error signal generating means generates the parity error signal on a clock cycle immediately following the determination of a parity error by the parity checking means.

16. A system as recited in claim 10, and further comprising means connected to the accessing and storing means for storing information in the buffer continuously until the buffer is full, until a specified smaller amount of information has been stored, or until a specified event occurs.

17. A system as recited in claim 10, and further comprising means for diagnosing faults in the bus data monitoring and capturing system which are separate and apart from faults in the computer without disrupting the normal operation of the computer.

18. A system as recited in claim 10, wherein the trigger means includes means for setting and clearing a predetermined break point in the transfer of digital signals from the system bus by the second interface means.

19. A system for monitoring and capturing bus data in a digital computer having a CPU, a memory, at least one I/O module, each having a parity generator for generating a parity bit, a system bus for permitting communication between the CPU, memory and I/O module, the system bus including an address field, a data field and a control field, each field including a plurality of lines for transmitting digital signals representing predetermined information, and a plurality of clock generators for timing the transmission of the digital signals on the lines, comprising:
- a control unit that transmits a plurality of function and data codes in serial form on a serial bus;
- a serial bus link gate array connected to the control unit via the serial bus for receiving the function and data codes and converting them into parallel form;
- means for receiving the parallel function and data codes from the serial bus link gate array converting them into a plurality of steering commands that select the lines of the fields and a plurality of clock commands that start or stop one or more of the clocks;
- a plurality of random access memories (RAMs) for storing information represented by the digital signals;
- second interface means for transferring digital signals from the system bus to the RAMs in response to the steering commands, including a first set of multiplexers connected to each of the lines of each of the bus fields, and a second set of multiplexers for selectively transferring the signals on the selected lines of the selected fields in accordance with the steering commands;
- trigger means connected to the buffer for starting or stopping the transfer of digital signals from the system bus to the RAMs in response to the clock commands; and
- output means for connecting the RAMs to the first interface means so that the information stored in the RAMs may be accessed by the control unit in order to locate faults in the computer without disrupting the normal operation thereof, the output means including a third set of multiplexers.

20. A system as recited in claim 19, wherein the system further comprises:
- means for checking the parity of the predetermined digital codes accessed from the system bus to determine the existence of a parity error; and
- means for generating a parity error signal in response to each parity error determined by the parity checking means; and
- means for transmitting the parity error signal on the system bus.

21. A system as recited in claim 20, wherein the parity error signal generating means is generates the parity error signal on a clock cycle immediately following the determination of a parity error by the parity checking means.

22. A system as recited in claim 19, further comprising means connected to the second interface means and the trigger means for storing information in the RAMs continuously until the RAMs are full, until a specified smaller amount of information has been stored in the RAMs, or until a specified event occurs, in response to predetermined ones of the function and data codes.

23. A system as recited in claim 19, further comprising means for diagnosing faults in the bus data monitoring and capturing system which are separate and apart from faults in the computer without disrupting the normal operation of the computer.

24. A system as recited in claim 19, wherein the trigger means includes means for setting and clearing a predetermined break point in the transfer of digital signals from the system bus by the second interface means.

* * * * *